(12) United States Patent
Yang

(10) Patent No.: US 6,453,280 B1
(45) Date of Patent: Sep. 17, 2002

(54) ELECTRONIC DICTIONARY CAPABLE OF IDENTIFYING IDIOMS

(75) Inventor: Li Ping Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/413,962

(22) Filed: Oct. 7, 1999

(30) Foreign Application Priority Data

Oct. 7, 1998 (CN) .......................................... 98119459

(51) Int. Cl.[7] .......................... G06F 17/21; G06F 17/28
(52) U.S. Cl. .............................................. 704/10; 704/4
(58) Field of Search ................... 704/2–7, 10; 707/530, 707/532

(56) References Cited

U.S. PATENT DOCUMENTS

| | | | | |
|---|---|---|---|---|
| 4,868,750 A | * | 9/1989 | Kucera et al. .................. | 704/9 |
| 5,214,583 A | * | 5/1993 | Miike et al. .................... | 704/2 |
| 5,349,368 A | * | 9/1994 | Takeda et al. .................. | 704/3 |
| 5,475,586 A | * | 12/1995 | Sata et al. ...................... | 704/2 |
| 5,528,491 A | * | 6/1996 | Kuno et al. ..................... | 704/7 |
| 5,541,938 A | * | 7/1996 | Koyama et al. ................ | 704/4 |
| 5,642,522 A | * | 6/1997 | Zaenen et al. ................. | 704/10 |
| 5,644,774 A | * | 7/1997 | Fukumochi et al. ........... | 704/7 |
| 5,842,159 A | * | 11/1998 | Nakamura et al. ............. | 704/4 |
| 6,085,204 A | * | 7/2000 | Chijiwa et al. ............. | 707/529 |

FOREIGN PATENT DOCUMENTS

| | | | | |
|---|---|---|---|---|
| JP | 5-314166 A | 11/1993 | ........... | G06F/15/38 |
| JP | 8-180058 A | 7/1996 | ........... | G06F/15/38 |
| JP | 8-194709 A | 7/1996 | ........... | G06F/15/38 |
| JP | 8-320871 A | 12/1996 | ........... | G06F/15/38 |
| JP | 10-105552 A | 4/1998 | ........... | G06F/15/38 |

* cited by examiner

Primary Examiner—Patrick N. Edouard
(74) Attorney, Agent, or Firm—Paul J. Otterstedt; Ryan, Mason & Lewis, LLP

(57) ABSTRACT

An electronic dictionary having an idiom processing function which can automatically identify idioms included in a present sentence from text of a first language, and which can output corresponding translated expressions in a second language. The electronic dictionary is operative to perform a technique which comprises an idiom processing operation which makes automatic identification possible by text capturing, sentence segmenting, local parsing and transfer lexicon matching. The electronic dictionary provides intelligent translation at the idiom level.

19 Claims, 3 Drawing Sheets

ELECTRONIC DICTIONARY CAPABLE OF IDENTIFYING IDIOMS

FIELD OF THE INVENTION

This invention relates to an electronic dictionary, and in particular to an electronic dictionary capable of handling idioms.

BACKGROUND OF THE INVENTION

For many years, people have been studying the machine translation technology which can translate written or speaking expressions from one language into another by means of computers. Machine translation is a kind of automatic translation from one language into another (or many others) without human aid. On the basis of linguistic analysis regarding the form and structure of a language, it builds machine lexicon and machine grammar with the mathematical approach, by taking advantage of the huge power of computers in storing and data processing. In order to realize the language translation, a machine translation system has to have the functions of lexicon analysis, syntactic analysis, grammar analysis, lexicon, idiom dictionary, semantic analysis and target language synthesis. However, there is still not an applicable system available yet, since machine translation is a frontier application science relating to linguistics, computational linguistics, computer science and many other subjects. Under this situation, people switched their focus to the electronic dictionary which performs the translation at the word level and is more practical. Electronic dictionary is a kind of new dictionary which stores and utilizes the data in the electronic form. An electronic dictionary is of great flexibility. It can organize the information in the ways of hypermedia and hypertext, support various retrieval methods, offer the feature of dynamic translation, and provide explanations for the retrieved word in the form of text, audio and image.

However, most existing electronic dictionaries can perform word level translation only. In case of there is an English sentence "He takes part in the activity.", existing electronic dictionaries can give Chinese translations for the single word "take", while the user can not get the Chinese meaning of "take part in".

There are some electronic dictionaries which are capable of idiom level translation. However, they have following restrictions to users:

They can give the translation when the user inputs the idiom as "take part in". In case of an user inputs a phrase "take an active part in", these electronic dictionaries will not be able to identify the idiom "take part in" and therefore can not give a useful Chinese translation.

If an user does not provide the correct head word in the idiom, those dictionaries will not give the idiom level translation. In the example of "take part in", if the user looks up the word "part" or "in" in the dictionary, he can not get the translation for the idiom "take part in".

SUMMARY OF THE INVENTION

The electronic dictionary with the idiom processing function according to the present invention will resolve the above problems.

In one illustrative aspect of the invention, an electronic dictionary with an idiom processing feature is operative to perform a technique which comprises:

storing a plurality of entries in the form of electronic data in a memory, each entry composed of a header of a first language and translated expressions in a second language corresponding to the header, wherein said headers include idioms of the first language;

registering a new entry into the memory; and retrieving the entry corresponding to a query word from the memory;

wherein said retrieving operation includes an idiom processing operation which automatically identifies idioms included in a present sentence from text of the first language and retrieves the corresponding translated expressions in the second language.

The goal, features and advantages of this invention will be understood more fully from the detailed description given hereinbelow, taken in conjunction with the accompanying drawings.

DETAILED DESCRIPTION OF PREFERRED EMBODIMENTS

Figure 1:
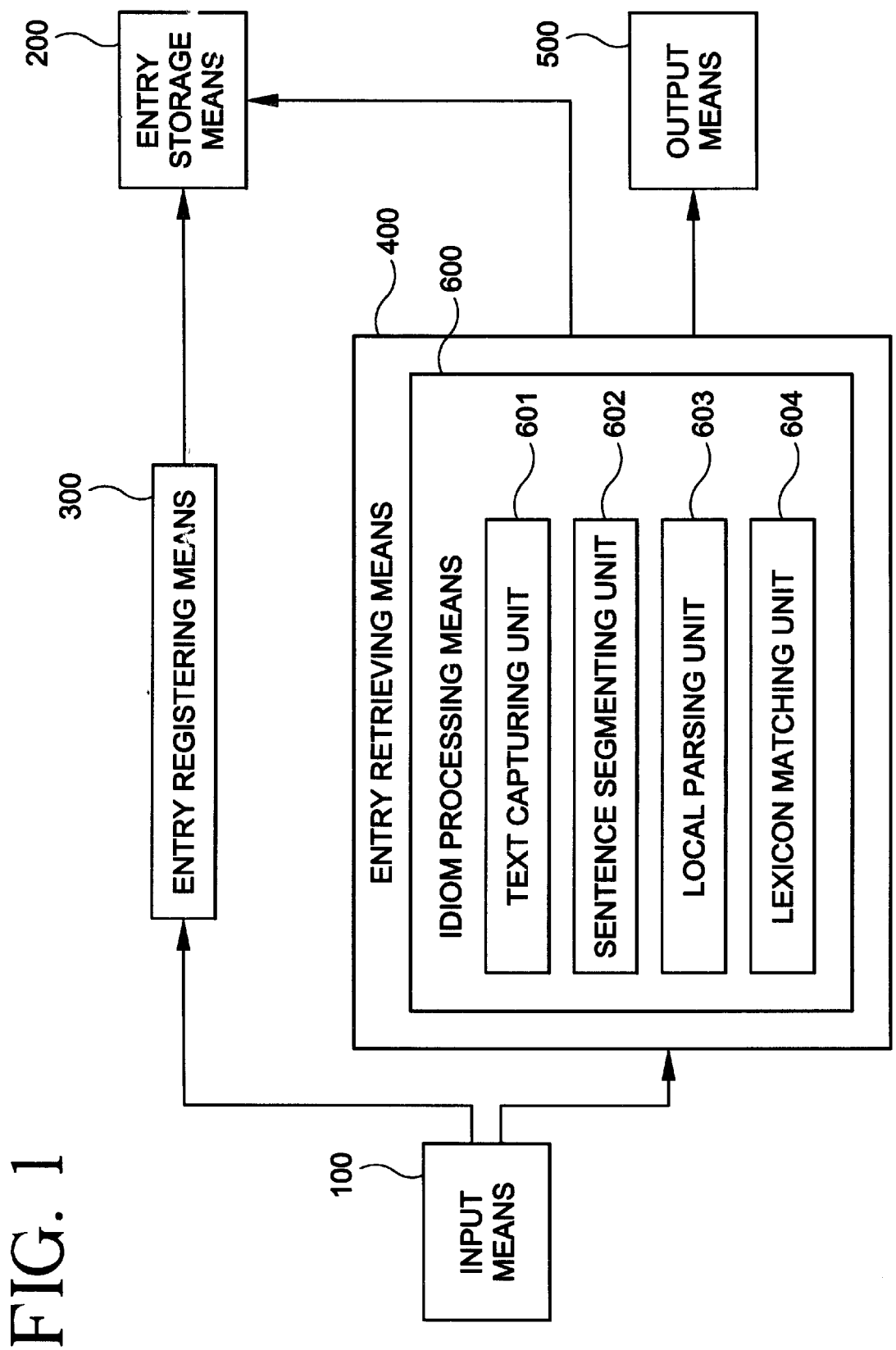
FIG. 1 is an overview illustration of the electronic dictionary according to the present invention.

The electronic dictionary according to the present invention is illustrated in FIG. 1. It is to be appreciated that the "means" elements in FIG. 1 may be implemented in a computer or other processor-based device. For example, the input means 100 may be a keyboard, the storage means 200 may be memory associated with a processor, and the output means 500 may be a display. However, other conventional computer elements may be employed. Further, a processor may be employed to implement the entry registering means 300 and entry retrieving means 400 (and its constituent elements).

The input means 100 is used to input word string or text in the source language; the entry storage means 200 is used to store a plurality of entries in the form of electronic data; the entry registering means 300 is used to register new entries into the entry storage means 200; the entry retrieving means 400 is used to retrieve the entries matched with the query word from the entry storage means 200; output means 500 is used to output the entries that match the query word.

As illustrated in FIG. 1, the entry retrieving means 400 in the electronic dictionary according to this invention comprises an idiom processing means 600. The idiom processing means 600 is composed of a text capture unit 601, a sentence segmentation unit 602, a local grammar parsing unit 603 and a transfer lexicon matching unit 604.

Figure 2:
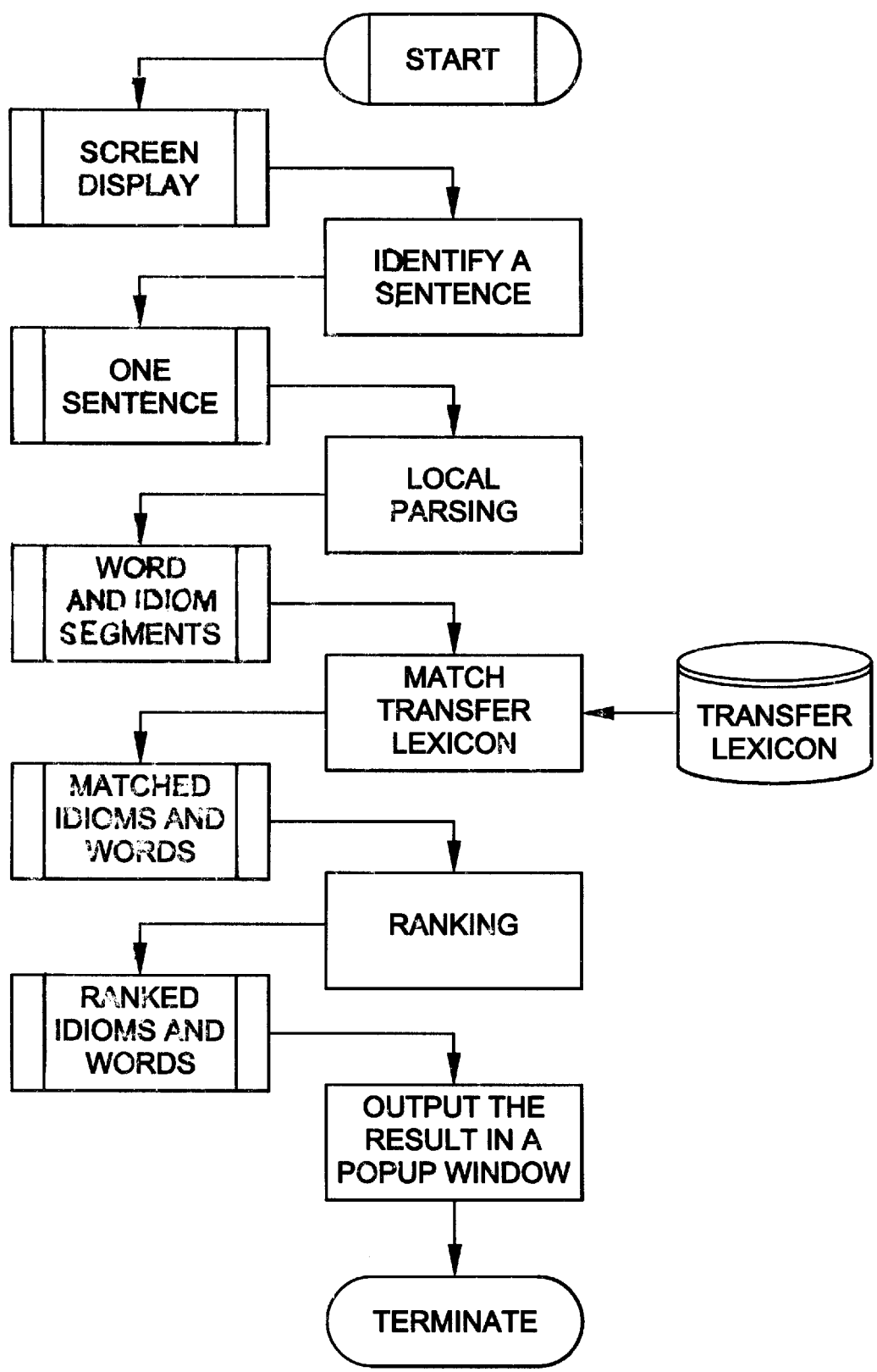
FIG. 2 illustrates the work flow for the idiom processing means for the electronic dictionary.

FIG. 2 illustrates in detail the composition of idiom processing means 600 and its work flow. As illustrated in FIG. 2, when the idiom processing means 600 is activated, text capture unit 601 will capture a piece of text from screen display containing the query word, while the query word is the one pointed by the user with the cursor. Then, the sentence segmentation unit 602 will identify the sentence containing the query word. The local grammar parsing unit 603 will identify all of possible grammatical components from the sentence. The transfer lexicon matching unit 604 will match the parsing result with the entries in the lexicon, each matched entry can give a translation for a segment in the sentence. Those matched entries which cover the query word forms an entry set. After ranking the entries in the above entry set according to degree of match between the entry and the sentence, the output will be displayed on the screen.

For the English to Chinese electronic dictionary, local grammar parsing unit 603 can identify following grammatical components:

1. noun phrase,
2. verb phrase,
3. preposition phrase,
4. adjective phrase,
5. adverb phrase,
6. single particle.

A noun phrase has one of the following basic constructions or a composition of several basic constructions:

1.1. single noun,
1.2. noun+noun,
1.3. noun+of +noun,
1.4. noun's noun,
1.5. adjective+noun,
1.6. article+noun,
1.7. pronoun+noun,
1.8. numeral+noun.

A verb phrase has one of the following basic constructions or a composition of several basic constructions:

2.1. single verb,
2.2. be+verb,
2.3. have+verb,
2.4. adverb+verb,
2.5. verb+adverb.

A preposition phrase has the construction of:

3.1. preposition+noun phrase.

An adjective phrase has one of the following basic constructions:

4.1. single adjective,
4.2. more+adjective,
4.3. the most+adjective.

An adverb phrase has one of the following basic constructions:

5.1. single adverb,
5.2. more+adverb,
5.3. the most+adverb.

In the following, the sentence "He takes an active part in the activity." is taken as an example to illustrate local parsing procedures:

Step I he ->noun
take->verb
a->article
active->adjective
part->noun
part->adjective
in->preposition
in->particle
the->article
activity->noun Step II he: noun
take: verb
a: article
active: adjective
part: noun
part: adjective
in: preposition
in: particle
the: article
activity: noun
active part: adjective+noun->noun
the activity: article+noun->noun Step III he: noun
take: verb
a: article
active: adjective
part: noun
part: adjective
in: preposition
in: particle
the: article
activity: noun
active part: noun
the activity: noun
an active part: article+noun->noun
in the activity: preposition+noun->preposition phrase While identifying grammatical components in a sentence, there may happen that one word belongs to more than one components which are of totally different part of speech. In the above sentence, the word "part" can be either an adjective or a noun, and the word "in" can be either a preposition or a particle. In this case, the result of local parsing will keep all of the possible grammatical components.

After the local grammar parsing is completed, idiom processing means 600 will activate the transfer lexicon matching unit 604 to perform matching between the entries in the transfer lexicon and the result of the local grammar parsing.

The following presents the structure of the transfer lexicon. One entry in the lexicon consists of three parts: head, grammar and translation.

| Head | | Grammar | Translation | |
| --- | --- | --- | --- | --- |
| take | v | Obj part  comp (p in) | 参加 | objprep |
| take | v | obj n fin wh  comp (pt in) | 领会 | obj |
| make sure | v | comp(p about of) | 确定 | objprep |
| make | v | Obj it  comp a  comp thatc | 使 | thatc |
| | | | 变得 | adj |
| place | n loc | nobj inf | inf的地方 | |

The notations in the above table are interpreted as:

| Notation | Interpretation |
| --- | --- |
| a | adjective. |
| adj | adjective. |
| comp | complement. |
| fin | finite verb. |
| inf | infinitive. |
| n | noun. |
| nobj | object of the noun precedes it. |
| n loc | noun denoting a location. |

-continued

| Notation | Interpretation |
|---|---|
| Obj | object headed with specified word. |
| obj | object which can be one of the grammar components list after it. |
| p | preposition |
| pt | particle. |
| thatc | clause headed by 'that'. |
| v | verb. |
| wh | clause headed by 'who', 'where', 'when', or 'what'. |

The head of an entry may consists more than one words, for example:

make sure<v comp(p about of)<硫定objprep it takes the first word as the head of the entry.

In the grammar part of the entry, the first component is the part of speech of the head word.

Following the part of speech, it comes a series of grammar components. A grammar component is composed of its name and its description. It may consists of several sub-components.

In the example, obj n fin wh it describes an object grammar component. This object has to be a noun, a finite verb phrase or a clause headed by wh.

In the example:

p about of it describes a preposition phrase. This preposition phrase has to be headed by 'about' or 'of'.

In the translation part, there are grammar parts together with Chinese words as the translation of the English part of an entry.

Figure 3:
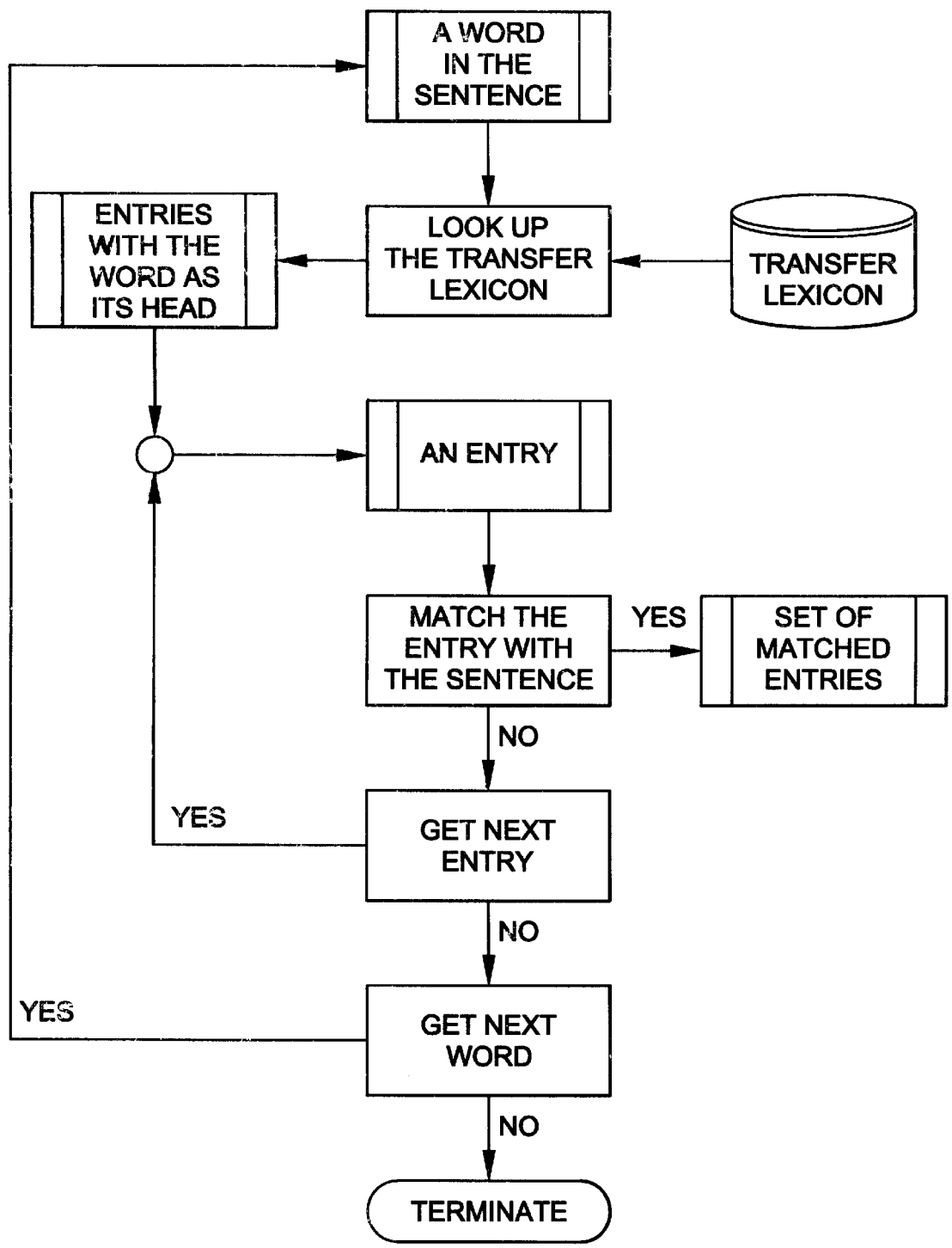
FIG. 3 illustrates the work flow for the transfer lexicon matching.

FIG. 3 illustrates the procedures to match the entries in the transfer lexicon with the parsing result of the sentence. The followings are two examples of the transfer lexicon entry.

The first one is take<v (Obj part) (comp (p in))<t(参加objprep)

The skeleton idiom for this entry is "take part in" (A skeleton idiom is an idiom which contains the necessary words only). Within the entry, "take" is the head word. "v" tells this is a verb phrase. "(Obj part)" indicates that the verb "take" needs to have the word "part" as its object. "comp" specifies a complement component after the object. "(p in)" denotes that the complement should a preposition phrase headed by "in". "t(参加objprep)" shows how to translate the idiom into Chinese. "objprep" represents the object of preposition "in".

The second example is take<v (obj n fin wh) (comp (pt in))<t(参加obj)

The skeleton idiom for this entry is "take in". Within the entry, "(obj n fin wh)" indicates that verb "take" needs to have an object. The object can be a noun phrase, a finite verb phrase or a clause leading by "what", "where", "when" etc. "(pt in)" denotes that the complement should be the particle "in".

Comparing the above two entries with the parsing result of "He takes an active part in the activity.", it gives following piece by piece matches 1. takes vs. take<v
2. an active part vs. (Obj part)
3. in the activity vs. (comp (p in)) and
1. takes vs. take<v
2. an active part vs. (obj n)
3. in vs. (comp (pt in))

In the above examples, both the two entries match with the sentence. If the query word is "take" or "in" both of them are in the set of dictionary lookup. However, if the query word is "part", only the entry "take part in" is in the set of dictionary lookup.

Finally, the matched entries are ranked according to the degree of match between the entry and the parsing result. For example, take the sentence "He takes an active part in the activity", and the query word "take", there are three matched entries available: "take part in", "take in" and "take". According to the length of the skeleton idioms, i.e. number of words in the skeleton idiom, the output entries are ranked as:

1. take part in:参加
2. take in:参加
3. take:参加

From above content, the electronic dictionary described by this invention can identify all of the idioms from the input text that contain the query word. This invention realized the idiom level intelligent translation.

For those skilled in the art, this invention allows various modifications and deformations under the condition that the spirit and the category of this invention remain unchanged; this invention intends to protect all of these modification and deformation.

What is claimed is:

1. An electronic dictionary having an idiom processing function, comprising:

means for storing a plurality of entries in the form of electronic data, each entry comprising a header of a first language and one or more translated expressions in a second language corresponding to the header, wherein said headers include idioms of the first language;

means for registering a new entry into the storing means; and means for retrieving the entry corresponding to a query word from the storing means;

wherein said retrieving means includes idiom processing means which automatically identifies idioms included in a present sentence from text of the first language and retrieves corresponding translated expressions in the second language, and further wherein the query word, with respect to at least an idiom in the present sentence, is specified by a user pointing to any portion of the idiom, in accordance with display means and input means, and the idiom is identified regardless of which portion of the idiom the user points to.

2. The electronic dictionary according to claim 1, wherein said idiom processing means comprises:

means for capturing the text containing the query word;

means for segmenting the present sentence containing the query word;

means for local parsing to identify grammatical components from the present sentence;

means for matching the entries in said storing means with the parsing result of the present sentence; and means for outputting the matched entries.

3. The electronic dictionary according to claim 2, wherein said outputting means ranks the entries to be output according to the degree of match.

4. The electronic dictionary according to claim 1, wherein the first language is English and the second language is Chinese.

5. The electronic dictionary according to claim 2, wherein the means for local parsing to identify grammatical components from the present sentence further comprises identifying grammatical components as basic grammatical constructions and compositions of basic grammatical constructions.

6. The electronic dictionary according to claim 5, wherein a basic grammatical construction comprises a noun and a composition of the basic grammatical construction comprises at least one of a "noun+noun" composition, a "noun+of+noun" composition, a "noun's noun" composition, an "adjective+noun" composition, an "article+noun" composition, a "pronoun+noun" composition, and a "numeral+noun" composition.

7. The electronic dictionary according to claim 5, wherein a basic grammatical construction comprises a verb and a composition of the basic grammatical construction comprises at least one of a "be+verb" composition, a "have+verb" composition, an "adverb+verb" composition, and a "verb+adverb" composition.

8. The electronic dictionary according to claim 5, wherein a basic grammatical construction comprises a "preposition+a noun phrase" composition.

9. The electronic dictionary according to claim 5, wherein a basic grammatical construction comprises an adverb and a composition of the basic grammatical construction comprises at least one of a "more+adverb" composition, and a "the most+adverb" composition.

10. A method for providing an idiom processing function in an electronic dictionary, the method comprising the steps of:
    storing a plurality of entries in the form of electronic data in storing means, each entry comprising a header of a first language and one or more translated expressions in a second language corresponding to the header, wherein said headers include idioms of the first language;
    registering a new entry into the storing means; and
    retrieving the entry corresponding to a query word from the storing means;
    wherein said retrieving operation includes an idiom processing operation which automatically identifies idioms included in a present sentence from text of the first language and retrieves corresponding translated expressions in the second language, and further wherein the query word, with respect to at least an idiom in the present sentence, is specified by a user pointing to any portion of the idiom, in accordance with display means and input means, and the idiom is identified regardless of which portion of the idiom the user points to.

11. The method according to claim 10, wherein said idiom processing operation comprises the steps of:
    capturing the text containing the query word;
    segmenting the present sentence containing the query word;
    local parsing to identify grammatical components from the present sentence;
    matching the entries in said storing means with the parsing result of the present sentence; and
    outputting the matched entries.

12. The method according to claim 11, wherein said outputting operation ranks the entries to be output according to the degree of match.

13. The method according to claim 10, wherein the first language is English and the second language is Chinese.

14. The method according to claim 11, wherein the step of local parsing to identify grammatical components from the present sentence further comprises identifying grammatical components as basic grammatical constructions and compositions of basic grammatical constructions.

15. The method according to claim 14, wherein a basic grammatical construction comprises a noun and a composition of the basic grammatical construction comprises at least one of a "noun+noun" composition, a "noun+of+noun" composition, a "noun's noun" composition, an "adjective+noun" composition, an "article+noun" composition, a "pronoun+noun" composition, and a "numeral+noun" composition.

16. The method according to claim 14, wherein a basic grammatical construction comprises a verb and a composition of the basic grammatical construction comprises at least one of a "be+verb" composition, a "have+verb" composition, an "adverb+verb" composition, and a "verb+adverb" composition.

17. The method according to claim 14, wherein a basic grammatical construction comprises a "preposition+a noun phrase" composition.

18. The method according to claim 14, wherein a basic grammatical construction comprises an adverb and a composition of the basic grammatical construction comprises at least one of a "more+adverb" composition, and a "the most+adverb" composition.

19. Apparatus for providing an idiom processing function in an electronic dictionary, the apparatus comprising:
    memory for storing a plurality of entries in the form of electronic data in the memory, each entry comprising a header of a first language and one or more translated expressions in a second language corresponding to the header, wherein the headers include idioms of the first language;
    at least one processor operative to enable: (i) registering a new entry into the memory; and (ii) retrieving the entry corresponding to a query word from the memory; wherein the retrieving operation includes an idiom processing operation which automatically identifies idioms included in a present sentence from text of the first language and retrieves corresponding translated expressions in the second language, and further wherein the query word, with respect to at least an idiom in the present sentence, is specified by a user pointing to any portion of the idiom, in accordance with a display and an input device, and the idiom is identified regardless of which portion of the idiom the user points to.

* * * * *